United States Patent
Kiyama et al.

(10) Patent No.: US 11,985,290 B2
(45) Date of Patent: May 14, 2024

(54) INFORMATION PROCESSING DEVICE, INFORMATION PROCESSING METHOD, REPRODUCTION PROCESSING DEVICE, AND REPRODUCTION PROCESSING METHOD

(71) Applicant: Sony Group Corporation, Tokyo (JP)

(72) Inventors: Yuka Kiyama, Tokyo (JP); Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 249 days.

(21) Appl. No.: 17/622,880

(22) PCT Filed: Jun. 29, 2020

(86) PCT No.: PCT/JP2020/025591
§ 371 (c)(1),
(2) Date: Dec. 27, 2021

(87) PCT Pub. No.: WO2021/002338
PCT Pub. Date: Jan. 7, 2021

(65) Prior Publication Data
US 2022/0150461 A1     May 12, 2022

Related U.S. Application Data

(60) Provisional application No. 62/870,507, filed on Jul. 3, 2019.

(51) Int. Cl.
*H04N 13/178* (2018.01)
*H04N 13/111* (2018.01)
(Continued)

(52) U.S. Cl.
CPC ........ *H04N 13/178* (2018.05); *H04N 13/111* (2018.05); *H04N 13/189* (2018.05); *H04N 13/194* (2018.05)

(58) Field of Classification Search
CPC .. H04N 13/178; H04N 13/111; H04N 13/189; H04N 13/194; H04N 21/4725;
(Continued)

(56) References Cited

U.S. PATENT DOCUMENTS 10,999,583 B2 * 5/2021 Tourapis .......... H04N 21/44004
11,736,675 B2 * 8/2023 He ...................... H04N 13/183
348/39
(Continued)

FOREIGN PATENT DOCUMENTS

JP      2010-117802 A     5/2010
WO      2018/031827 A1    2/2018
(Continued)

OTHER PUBLICATIONS

Deshpande, Sachin, "Dash Viewpoint Information and Group Signaling", International Organisation for Standardisation Organisation Internationale De Normalisation, Iso/Iec JTC1/SC29/WG11 MPEG2018/m44623, 20181008-0181012, XP030191341, pp. 1-4.
(Continued)

*Primary Examiner* — Fernando Alcon
(74) *Attorney, Agent, or Firm* — XSENSUS LLP

(57) ABSTRACT

Provided are an information processing device, an information processing method, a reproduction processing device, and a reproduction processing method that provide a high-quality viewing experience to a user. A metadata generation unit generates transition identification information for identifying a second viewpoint that is a viewpoint position of a second video transitionable from a first video whose viewpoint position is a first viewpoint. A file generation unit
(Continued)

```
┌─────────────────────────────────────────────────────────────┐ ┌─111
│ aligned(8) class ViewpointTrackGroupBox extends TrackGroupTypeBox('vipo') { │
│         signed viewpoint_label;                             │
│         ViewpointPosStruct();                               │
│         ViewpointGroupStruct();                             │
│         ViewpointGlobalCoordinateSysRotationSturuct();      │
│         SwitchableContentStruct();                          │
│ }                                                           │
└─────────────────────────────────────────────────────────────┘

┌─────────────────────────────────────────────────────────────┐ ┌─112
│ aligned(8) class SwitchableContentStruct() {                │
│         unsigned int(8) num_of_switchable_content;          │
│         for(i=0; i < num_of_switchable_content; i++){       │
│                 unsigned int(32) viewpoint_id;              │
│         }                                                   │
│ }                                                           │
└─────────────────────────────────────────────────────────────┘
``` generates a file including data of the first video data and the transition identification information.

18 Claims, 23 Drawing Sheets

(51) Int. Cl.
*H04N 13/189* (2018.01)
*H04N 13/194* (2018.01)

(58) Field of Classification Search
CPC ........... H04N 21/4858; H04N 21/8146; H04N 21/816; H04N 21/8586; H04N 21/235; H04N 21/435; H04N 13/275; H04N 13/282; H04N 21/21805
See application file for complete search history.

(56) References Cited

U.S. PATENT DOCUMENTS

| | | | |
|---|---|---|---|
| 11,758,112 B2 * | 9/2023 | Minato | G06F 16/7867 348/47 |
| 2014/0267600 A1 * | 9/2014 | Arcas | G06F 3/04815 348/42 |
| 2016/0330408 A1 * | 11/2016 | Costanzo | H04N 21/8547 |
| 2017/0084073 A1 * | 3/2017 | Pio | H04N 21/21805 |
| 2017/0084086 A1 * | 3/2017 | Pio | G06T 7/60 |
| 2017/0316806 A1 * | 11/2017 | Warren | G11B 27/031 |
| 2019/0306530 A1 * | 10/2019 | Fan | H04N 21/2362 |
| 2019/0313081 A1 * | 10/2019 | Oh | H04N 21/235 |
| 2019/0320156 A1 * | 10/2019 | Oh | H04N 19/597 |
| 2020/0275084 A1 * | 8/2020 | Aizawa | H04N 23/60 |
| 2020/0275156 A1 * | 8/2020 | He | H04N 21/4126 |
| 2023/0328214 A1 * | 10/2023 | Furukawa | H04N 21/812 382/154 |

FOREIGN PATENT DOCUMENTS

| | | |
|---|---|---|
| WO | 2018/211613 A1 | 11/2018 |
| WO | WO-2019070686 A1 * | 4/2019 |
| WO | WO-2019141901 A1 * | 7/2019 |
| WO | WO-2019195547 A1 * | 10/2019 |
| WO | WO-2020184645 A1 * | 9/2020 |

OTHER PUBLICATIONS

Thomas, Emmanuel, "On switching viewpoint: analysis derived from recently released content by Netflix", International Organisation for Standardisation Organisation Internationale De Normalisation, ISO/IEC JTC1/SC29/WG11 MPEG2019/m47605, Mar. 25, 2019-Mar. 29, 2019, Geneva, XP030211700, pp. 1-7.

Champel, Mary-Luc, "[OMAF] Multiviewpoint switching transitions", International Organisation for Standardisation Organisation Internationale De Normalisation, ISO/IEC JTC1/SC29/WG11 MPEG2017/m47385, Mar. 25, 2019-Mar. 29, 2019; Geneva, XP030211372, pp. 1-5.

Wang, Ye-Kui; et al, "WD 4 of ISO/IEC 23090-2 OMAF 2nd edition", International Organisation for Standardisation Organisation Internationale De Normalisation, ISO/IEC JTC1/SC29/WG11 N18227-v1, Jan. 14, 2019-Jan. 18, 2019, Marrakech, XP030212758, pp. 1-226.

International Search Report and Written Opinion dated Sep. 24, 2020, received for PCT Application PCT/JP2020/025591, Filed on Jun. 29, 2020, 10 pages including English Translation.

"Information technology—Coding of Audiovisual Objects—Part 12:ISO Base Media File Format", International Standard, ISO/IEC14496-12, Fifth Edition, Dec. 15, 2015, 248 pages.

* cited by examiner

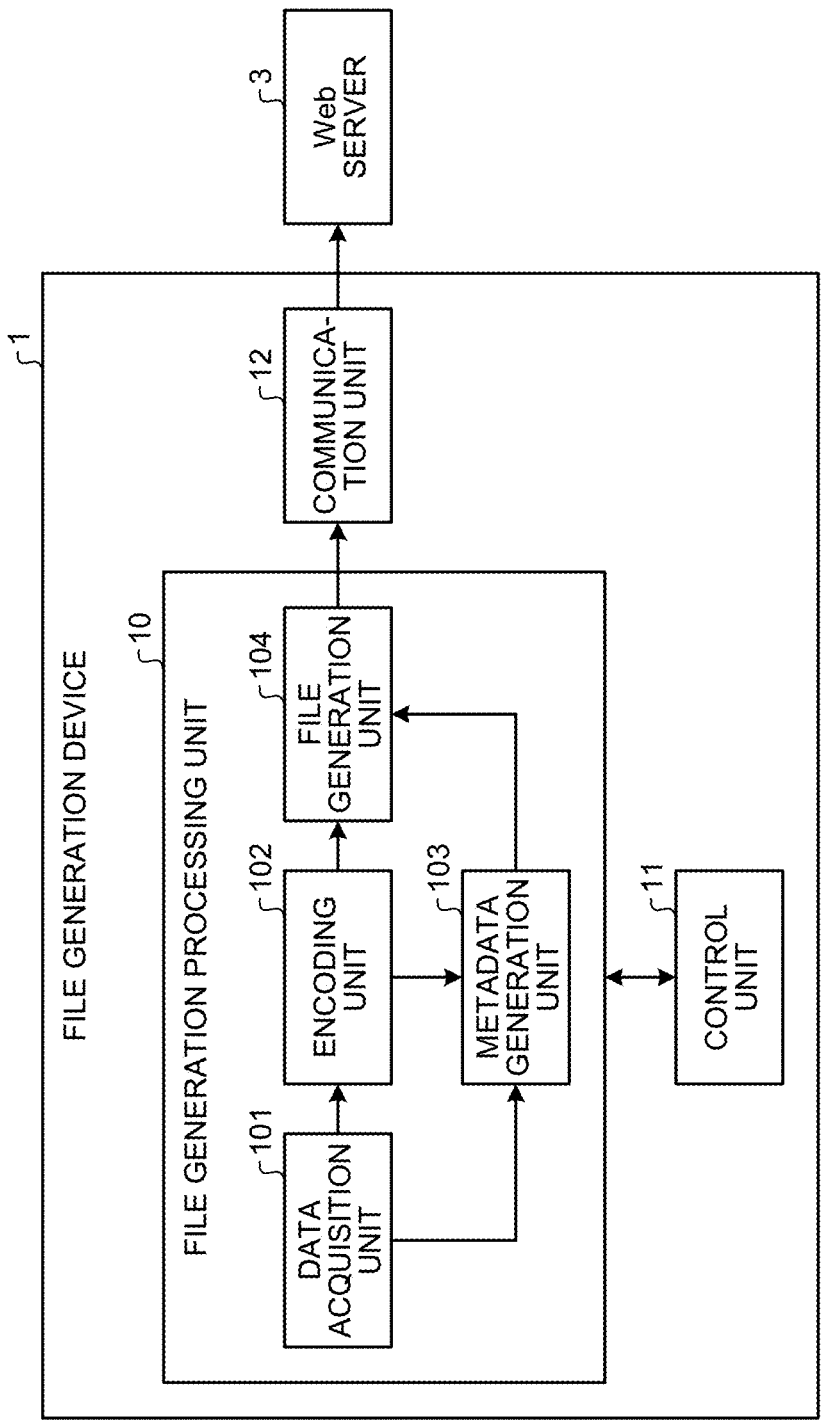

FIG.3

```
aligned(8) class ViewpointTrackGroupBox extends TrackGroupTypeBox('vipo') { signed viewpoint_label;

ViewpointPosStruct();

ViewpointGroupStruct();

ViewpointGlobalCoordinateSysRotationSturuct();

SwitchableContentStruct();
}
```
⌐111

```
aligned(8) class SwitchableContentStruct() { unsigned int(8) num_of_switchable_content;
    for(i=0; i < num_of_switchable_content; i++){
            unsigned int(32) viewpoint_id;
    }
}
```
⌐112

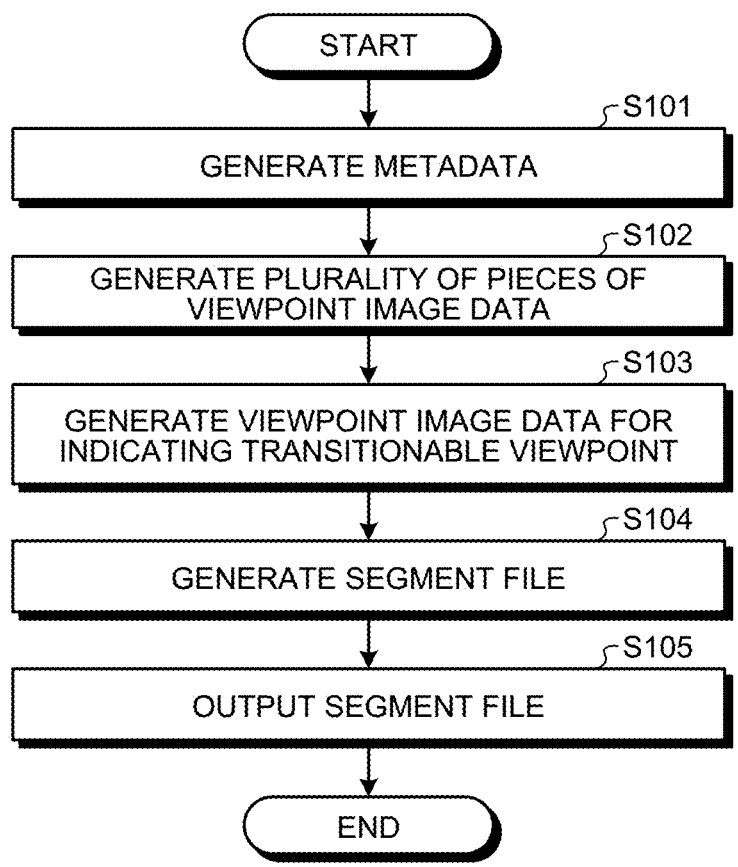

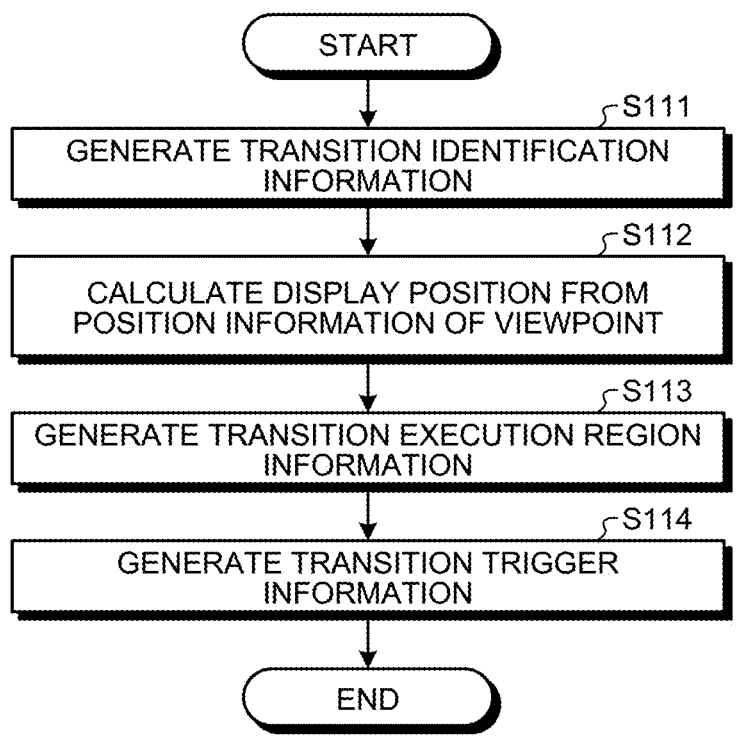

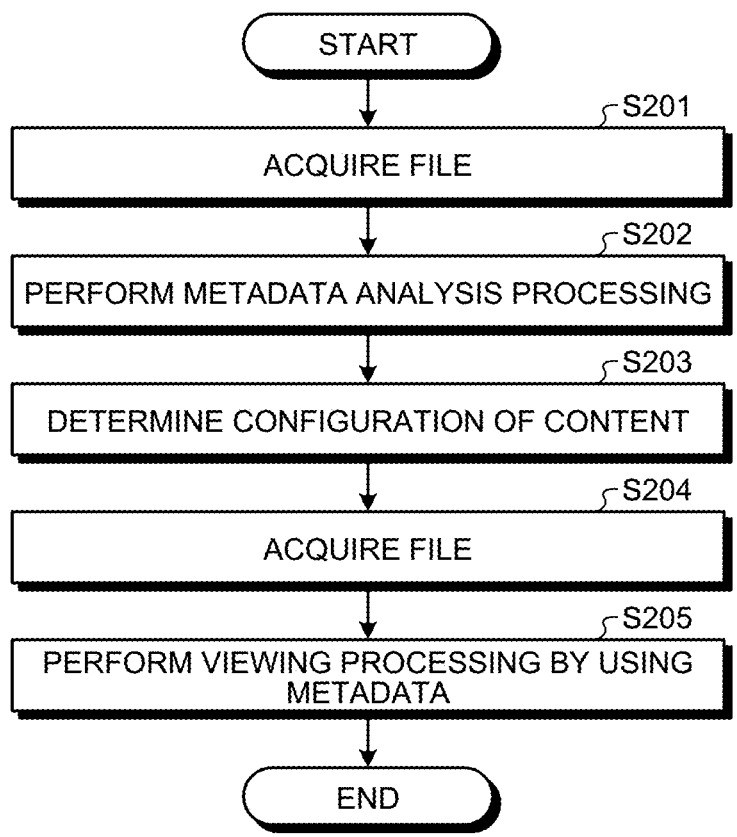

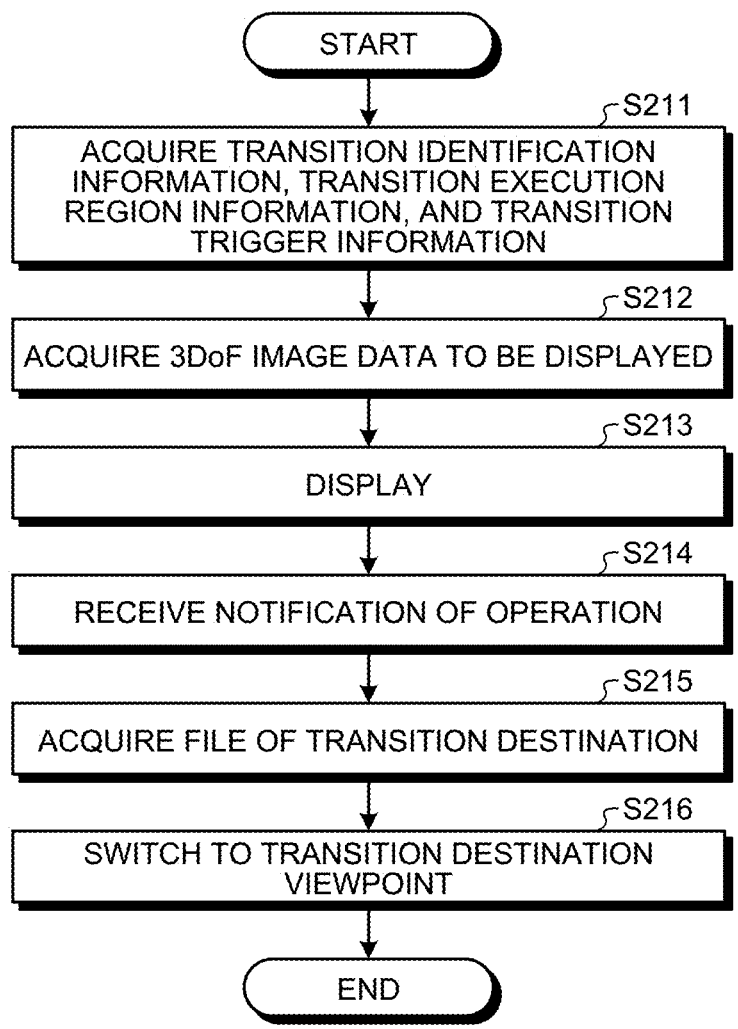

FIG.9

| Elements and attributes for VWPT descriptor | Use | Data type | Description |
|---|---|---|---|
| @value | M | xs: string | Specifies the viewpoint ID of the viewpont |
| ViewPointInfo | 1 | omaf2: ViewPointInfoType | Container element whose sub-elements and attributes provide information about the viewpoint |
| ViewPointInfo@label | O | xs: string | This attribute specifies a string that provides human readable label for the viewpoint |
| ... | | | |
| ViewPointInfo.SwitchableContent | 1 | SwitchableContentType | The attribute of this element specify the switchable content information. |
| ViewPointInfo.SwitchableContent@content | 1 | xs: unsignedInt | Specifies a whitespace-separated list of viewpoint_id of switchable content. |

FIG.10

```
<MPD>
 <Period>
  <AdaptationSet id = "1">
   <viewpoint schemeIDUri="urn:megl:omaf:2018:vwpt" value="1001">
    <ViewpointInfo label="livingroom">
     <SwitchableContent content="1002 1003"/></ViewpointInfo></viewpoint>
   <RepresentationSet id = "1">
    <BaseURL> VP1.mp4</BaseURL></Representation></AdaptationSet>
  <AdaptationSet id = "2">
   <viewpoint schemeIDUri="urn:megl:omaf:2018:vwpt" value="1002">
    <ViewpointInfo label="diningroom">
     <SwitchableContent content="1001"/></ViewpointInfo></viewpoint>
   <RepresentationSet id = "1">
    <BaseURL> VP2.mp4</BaseURL></Representation></AdaptationSet>
  <AdaptationSet id = "3">
   <viewpoint schemeIDUri="urn:megl:2018:vwpt" value="1003">
    <ViewpointInfo label="livingroom">
     <SwitchableContent content="1002 1003"/></ViewpointInfo></viewpoint>
   <RepresentationSet id = "1">
    <BaseURL> VP3.mp4</BaseURL></Representation></AdaptationSet>
 </Period>
```

FIG.11

```
aligned(8) class SwitchableContentStruct() { unsigned int(8) num_of_switchable_content;
    for(i=0; i < num_of_switchable_content; i++){
            unsigned int(32) VWPT_group_id;
    }
}
```
⌐131

```
aligned(8) class SwitchableContentStruct() { unsigned int(8) num_of_switchable_content;
    for(i=0; i < num_of¥_switchable_content; i++){
            string      MPD_URL;
    }
}
```
⌐132

FIG.12

```
aligned(8) class RegionForViewpoint() {                                211 unsigned int(8) num_of_switchable_content;
    for(i=0; i < num_of_switchable_content; i++){
        SphereRegionStruct(1, 1);
        unsigned int(32) viewpoint_id;
    }
}
```

```
aligned(8) class ViewpointTrackGroupBox extends TrackGroupTypeBox('vipo') {   212 signed viewpoint_label;

ViewpointPosStruct();

ViewpointGroupStruct();

ViewpointGlobalCoordinateSysRotationSturuct();

RegionForViewpoint();

| Bit index | Clause in this document | Description |
|---|---|---|
| 0 | 7.13.2.2 | Parameters for viewport-relative overlay |
| 1 | 7.13.2.3 | Parameters for sphere-relative projected omnidirectional overlay |
| 2 | 7.13.2.4 | Parameters for sphere-relative 2D overlay |
| 3 | 7.13.2.5 | Source region for the overlay. |
| | | Indicates the region within the decoded picture that is used as the content of the overlay. |
| 4 | 7.13.2.6 | Recommended viewport overlay. |
| | | Indicates the recommended viewport track whose Recommended viewports are used as the content of the overlay. |
| 5 | 7.13.2.7 | Overlay layering order |
| 6 | 7.13.2.8 | Overlay opacity |
| 7 | 7.13.2.9 | Controls for user interaction |
| 8 | 7.13.2.10 | Overlay label |
| 9 | 7.13.2.11 | Overlay priority |
| 10 | 7.13.2.12 | Associated sphere region |
| 11 | 7.13.2.13 | Overlay alpha composition |

FIG.14

```
aligned(8) class SphereRelativeOmniOverlay() {              ⎫ 222
  unsigned int(1) region_indication_type;
  unsigned int(1) timeline_change_flag;
  bit(6) reserved = 0;
    if (region_indication_type == 0){
      unsigned int(32) proj_picture_width;
      unsigned int(32) proj_picture_hight;
      unsigned int(32) proj_reg_width;
      unsigned int(32) proj_reg_hight;
      unsigned int(32) proj_reg_top;
      unsigned int(32) proj_reg_left;
    }
    else {
              SphereRegionStruct(1, 1);
              unsigned int(16) region_depth_minus1;
              unsigned int(32) unit_phere_distance_in_mm; //optional
}
```

```
aligned(8) class AssociatedSphereRegion() {                ⎫ 223

SphereRegionStruct(1, 1);

unsigned int (32) viewpoint_id;
}
```

| Bit index | Clause in this document | Description |
|---|---|---|
| 0 | 7.13.2.2 | Parameters for viewport-relative overlay |
| 1 | 7.13.2.3 | Parameters for sphere-relative projected omnidirectional overlay |
| 2 | 7.13.2.4 | Parameters for sphere-relative 2D overlay |
| 3 | 7.13.2.5 | Source region for the overlay. |
|   |   | Indicates the region within the decoded picture that is used as the content of the overlay. |
| 4 |   | Recommended viewport overlay. |
|   |   | Indicates the recommended viewport track whose Recommended viewports are used as the content of the overlay. |
| 5 | 7.13.2.7 | Overlay layering order |
| 6 | 7.13.2.8 | Overlay opacity |
| 7 | 7.13.2.9 | Controls for user interaction |
| 8 | 7.13.2.10 | Overlay label |
| 9 | 7.13.2.11 | Overlay priority |
| 10 | 7.13.2.12 | Associated sphere region |
| 11 | 7.13.2.13 | Overlay alpha composition |
| 12 |   | Associated viewpoint region |

FIG.16

```
                                                              ╭─232
aligned(8)  class  AssociatedViewpointRegion() {

SphereRegionStruct(1, 1);

unsigned int (32)  viewpoint_id;
}
```

FIG.17

| Bit index | Clause in this document | Description |
|---|---|---|
| 0 | 7.13.2.2 | Parameters for viewport-relative overlay |
| 1 | 7.13.2.3 | Parameters for sphere-relative projected omnidirectional overlay |
| 2 | 7.13.2.4 | Parameters for sphere-relative 2D overlay |
| 3 | 7.13.2.5 | Source region for the overlay. |
| | | Indicates the region within the decoded picture that is used as the content of the overlay. |
| 4 | 7.13.2.6 | Recommended viewport overlay. |
| | | Indicates the recommended viewport track whose Recommended viewports are used as the content of the overlay. |
| 5 | 7.13.2.7 | Overlay layering order |
| 6 | 7.13.2.8 | Overlay opacity |
| 7 | 7.13.2.9 | Controls for user interaction |
| 8 | 7.13.2.10 | Overlay label |
| 9 | 7.13.2.11 | Overlay priority |
| 10 | 7.13.2.12 | Associated sphere region |
| 11 | 7.13.2.13 | Overlay alpha composition |
| 12 | | Associated viewpoint region |

FIG.18

```
                                                  ┌242
aligned(8) class AssociatedSphereRegion() {
        SphereRegionStruct(1, 1);
}
```

```
                                                  ┌243
aligned(8) class AssociatedViewpoint() {
        unsigned int(32) viewpoint_id;
}
```

FIG.19

```
aligned(8) class AssociatedSphereRegion() { unsigned int(1)  same_region_flag;
        unsigned int(7)  reserved;
        if(!same_region_flag)
           SphereRegionStruct(1, 1);

unsigned int(32)  viewpoint_id;

```
                                                        ┌261
aligned(8)  class  RegionForViewpoint() { unsigned int(8)
num_of_switchable_content;
          for(i=0;  i < num_of_switchable_content;
i+){
              SphereRegionStruct(1, 1);
              unsigned int(32)  viewpoint_id;
          }
          unsigned int(8)  time_to_overlay;
}
```

FIG.21

```
                                                              ┌─311
aligned(8) class RegionForViewpoint() { unsigned int(8) num_of_switchable_content;
        for(i=0; i < num_of_switchable_content; i+){
          SphereRegionStruct(1, 1);
          unsigned int(32) viewpoint_id;
          unsigned int(32) track_id_for_interaction_area;
        } unsigned int(1) action_control_flag;
        unsigned int(7) reserved;
        if(action_control_flag == 0)              // TRANSITION BY CLICKING
          eles if(action_control_flag == 1)       // TRANSITION BY zooming
            unsgined float(32) zoom_threthold;    // THRESHOLD OF zooming FOR
VIEWPOINT TRANSITION

}
```

INFORMATION PROCESSING DEVICE, INFORMATION PROCESSING METHOD, REPRODUCTION PROCESSING DEVICE, AND REPRODUCTION PROCESSING METHOD

CROSS-REFERENCE TO RELATED APPLICATIONS

The present application is based on PCT filing PCT/JP2020/025591, filed Jun. 29, 2020, which claims priority to U.S. Provisional Application No. 62/870,507, filed on Jul. 3, 2019, the entire contents of each are incorporated herein by reference.

FIELD

The present invention relates to an information processing device, an information processing method, a reproduction processing device, and a reproduction processing method.

BACKGROUND

Moving picture experts group-dynamic adaptive streaming over HTTP (MPEG-DASH) exists as a standard of adaptive content delivery technology based on the hypertext transfer protocol (HTTP). Further, international organization for standardization base media file format (ISOBMFF) which is a file container specification of an international standard technique for moving image compression, "MPEG-4", is provided as a file format of MPEG-DASH.

By the way, there is a video that reproduces an omnidirectional image obtained by mapping a three-dimensional structure image, which is an image obtained by projecting an image of 360 degrees around in a horizontal direction and an image of 180 degrees around in a vertical direction onto a three-dimensional structure, as a plane image, like a so-called omnidirectional video. The omnidirectional video is also called a 3 degrees of freedom (3DoF) video, and the omnidirectional image is also called a projected plane image or a 3DoF image. In MPEG-I omnidirectional media format (OMAF), the use of the MPEG-DASH for the delivery of the three-dimensional structure image forming the omnidirectional image has been considered.

Furthermore, in an MPEG-I Phase 1b requirement, a technology for delivering the omnidirectional video from a plurality of viewpoints, which is called Multiple Viewpoint, has been proposed. By using this Multiple Viewpoint, it is possible to provide a content to a user by performing switching from an omnidirectional video of a certain viewpoint to an omnidirectional video of another viewpoint. The viewpoint refers to a viewpoint position of the omnidirectional video.

CITATION LIST

Non Patent Literature

Non Patent Literature 1: "ISO/IEC" 14496-12: 2015, Information technology, Coding of audio-visual objects, Part 12: ISO base media file format, 2015-12

SUMMARY

Technical Problem

However, a client device does not have information indicating a creator's intention such as to which other omnidirectional video transition can be made from a currently viewed omnidirectional video. In a delivery system in which the client device does not have the information indicating the transitionable omnidirectional video or the like, it is difficult to provide a viewing experience including the transition to the transitionable omnidirectional video, and the quality of the viewing experience of a viewer may be impaired.

In addition, since a function of implementing video transition depends on a type of a function implemented in the client device, the creator's intention is not always appropriately reflected when the content is reproduced. Therefore, the quality of the viewing experience of the user may be impaired.

Therefore, the present disclosure provides an information processing device, an information processing method, a reproduction processing device, and a reproduction processing method that provide a high-quality viewing experience to a user.

Solution to Problem

According to the present disclosure, a metadata generation unit generates transition identification information for identifying a second viewpoint that is a viewpoint position of a second video transitionable from a first video whose viewpoint position is a first viewpoint. A file generation unit generates a file including data of the first video data and the transition identification information.

BRIEF DESCRIPTION OF DRAWINGS

FIG. 2 is a block diagram of a file generation device.

FIG. 3 is a diagram for describing storage of transition identification information.

FIG. 5 is a flowchart of file generation processing performed by the file generation device.

FIG. 6 is a flowchart of metadata generation processing.

FIG. 7 is a flowchart of reproduction processing performed by the client device.

FIG. 8 is a flowchart of viewpoint transition processing.

FIG. 9 is a diagram illustrating an extension example of a VWPT descriptor.

FIG. 10 is a diagram illustrating an example of an MPD file in which ViewpintInfo.SwitchableContent is included in the VWPT descriptor.

FIG. 11 is a diagram illustrating an example of storage of transition identification information having a viewpoint group as a transition destination.

FIG. 12 is a diagram illustrating an example of SphereRegionStruct( ) and RegionForViewpoint( ).

FIG. 13 is a diagram illustrating a control structure of an overlay.

FIG. 14 is a diagram illustrating an example of SphereRelativeOmniOverlay( ) and AssociatiedSpereRegion( ).

FIG. 15 is a diagram illustrating an example of overlay_control_struct( ) to which a new control structure for storing transition execution region information is newly added.

FIG. 16 is a diagram illustrating an example of Associatedviewpointregion( ).

FIG. 17 is a diagram illustrating an example of overlay_control_struct( ) to which a new control structure for storing transition identification information is newly added.

FIG. 18 is a diagram illustrating an example of Associatedviewpointregion( ) and AssociatedViewpoint( ).

FIG. 19 is a diagram illustrating an example of AssociatedSphereRegion( ) in a case where a video display region is diverted for a transition execution region.

FIG. 20 is a diagram illustrating an example of RegionForViewpoint( ) in a case where the transition execution region information is displayed after a certain period of time.

FIG. 21 is a diagram illustrating an example of RegionForViewpoint( ) in a case of switching user interaction.

DESCRIPTION OF EMBODIMENTS

Hereinafter, embodiments of the present disclosure will be described in detail with reference to the drawings. Note that, in each of the following embodiments, the same reference signs denote the same portions, and an overlapping description will be omitted. Furthermore, the scope disclosed in the present technology is not limited to the contents of the embodiments, and includes the contents described in the following Non Patent Literatures known at the time of filing.

Non Patent Literature 1: (described above)
Non Patent Literature 2: ISO/IEC 23090-2: 2019, Information technology, Coded representation of immersive media, Part 2: Omnidirectional media format, 2019-01
Non Patent Literature 3: N18393, WD5 of ISO/IEC 23090-2 OMAF 2nd edition, 2019-05-16
Non Patent Literature 4: m47385, [OMAF] Multiviewpoint switching transitions, 2019-03
Non Patent Literature 5: "Matroska Media Container", [Searched on Mar. 12, 2020], Internet <URL: https://www.matroscka.org/>

That is, the contents described in the above-described Non Patent Literatures are also incorporated herein by reference. That is, the contents described in the above-described Non Patent Literatures also serve as a basis for determining support requirements. For example, even in a case where file structures described in Non Patent Literatures 1 to 5 are not directly defined in the detailed description of the invention, they fall within the scope of the present disclosure and satisfy the support requirements of the claims. Furthermore, for example, even in a case where technical terms such as parsing, syntax, and semantics are also not directly defined in the detailed description of the invention, the technical terms fall within the scope of the present disclosure and satisfy the support requirements of the claims.

Further, the present disclosure will be described in the following order.

1. First Embodiment
1.1 Modified Example (1) of First Embodiment
1.2 Modified Example (2) of First Embodiment
2. Second Embodiment
2.1 Modified Example (1) of Second Embodiment
2.2 Modified Example (2) of Second Embodiment
2.3 Modified Example (3) of Second Embodiment
2.3 Modified Example (4) of Second Embodiment
3. Third Embodiment
4. Fourth Embodiment 1. First Embodiment (Configuration of Delivery System According to First Embodiment)

Figure 1:
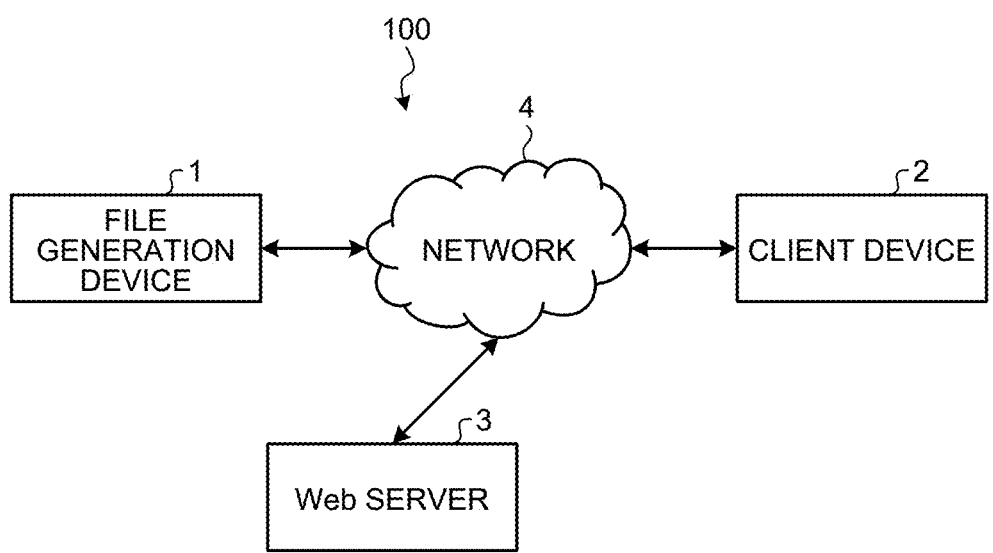
FIG. 1 is a system configuration diagram of an example of a delivery system.

FIG. 1 is a system configuration diagram of an example of a delivery system. A delivery system 100 includes a file generation device 1 that is an information processing device, a client device 2 that is a reproduction processing device, and a web server 3. The file generation device 1, the client device 2, and the web server 3 are connected to a network 4. The file generation device 1, the client device 2, and the web server 3 can perform communication with one another via the network 4. Here, although FIG. 1 illustrates a case where the number of each device is one, the delivery system 100 may include a plurality of file generation devices 1 and a plurality of client devices 2.

The file generation device 1 generates a 3 degrees of freedom (3DoF) content which is data for providing a 3DoF video. The file generation device 1 uploads the generated 3DoF content to the web server 3. Here, a configuration in which the web server 3 provides the 3DoF content to the client device 2 will be described in the present embodiment, but the delivery system 100 can have another configuration. For example, the file generation device 1 may have a function of the web server 3, store the generated 3DoF content therein, and provide the 3DoF content to the client device 2.

The web server 3 holds the 3DoF content uploaded from the file generation device 1. Then, the web server 3 provides the 3DoF content specified by a request from the client device 2.

The client device 2 transmits a transmission request for the 3DoF content to the web server 3. Then, the client device 2 acquires the 3DoF content specified by the transmission request from the web server 3. Then, the client device 2 decodes the 3DoF content to generate a video, and causes a display device such as a monitor to display the video.

(Configuration of File Generation Device According to First Embodiment)

Next, details of the file generation device 1 will be described. FIG. 2 is a block diagram of the file generation device. As illustrated in FIG. 2, the file generation device 1 which is the information processing device includes a file generation processing unit 10, a control unit 11, and a communication unit 12. The control unit 11 performs processing related to a control of the file generation processing unit 10. For example, the control unit 11 performs a centralized control of a timing of an operation of each unit of the file generation processing unit 10 or the like. The file generation processing unit 10 includes a data acquisition unit 101, an encoding unit 102, a metadata generation unit 103, and a file generation unit 104.

The data acquisition unit 101 receives original data of the 3DoF content for displaying the 3DoF video. The original data of the 3DoF content includes image data for generating a 3DoF image and control information for generating metadata. The control information includes, for example, time information of each piece of image data, viewpoint position information of each piece of image data, and information of image data transitionable from each piece of image data. Furthermore, the control information includes information indicating a viewpoint corresponding to each piece of image data, position information of each viewpoint, information indicating a correspondence with a transitionable viewpoint, and the like. The data acquisition unit 101 outputs the acquired image data included in the original data of the 3DoF content to the encoding unit 102. In addition, the data acquisition unit 101 outputs the acquired control information included in the original data of the 3DoF content to the metadata generation unit 103.

The encoding unit 102 receives the image data from the data acquisition unit 101. Then, the encoding unit 102 performs encoding processing on the image data to generate 3DoF image data. Then, the encoding unit 102 outputs the generated 3DoF image data to the file generation unit 104.

Hereinafter, the viewpoint position may be referred to as a viewpoint. Moreover, in a case of emphasizing the fact that the 3DoF image data is an image when viewed from various viewpoint positions, the 3DoF image data may be referred to as "viewpoint image data", and an omnidirectional image displayed in a case where the viewpoint image data is reproduced may be referred to as a "viewpoint image".

The metadata generation unit 103 receives the control information from the data acquisition unit 101. Next, the metadata generation unit 103 generates metadata on the basis of the control information. The metadata includes control information related to image generation and reproduction such as what codec is used for compression. Moreover, the metadata generation unit 103 generates the following information as the metadata.

The metadata generation unit 103 generates transition identification information for identifying a viewpoint transitionable from each viewpoint on the basis of the acquired control information. Specifically, the metadata generation unit 103 assigns viewpoint_id, which is identification information, to each viewpoint. Further, the metadata generation unit 103 associates identification information of the transitionable viewpoint with identification information of a viewpoint that is a transition source. By using the transition identification information, the client device 2 can identify a viewpoint transitionable from a specific viewpoint, and can implement transition to the transitionable viewpoint. Then, the metadata generation unit 103 associates the transition identification information having the viewpoint as the transition source with the viewpoint image data at each viewpoint.

Furthermore, the metadata generation unit 103 calculates a display position of a transition execution region corresponding to a transition destination viewpoint in the viewpoint image of the transition source on the basis of the position information of the viewpoint included in the control information. Next, the metadata generation unit 103 generates transition execution region information indicating the transition execution region on each viewpoint image by using the calculated display position of the transition execution region.

Next, the metadata generation unit 103 generates transition trigger information indicating an operation serving as a trigger for executing the transition specified by the control information. Thereafter, the metadata generation unit 103 associates corresponding transition execution region information and transition trigger information with each piece of viewpoint image data. In this manner, the metadata generation unit 103 associates the transition identification information and the transition execution region information with the corresponding viewpoint image data, thereby generating the 3DoF image data indicating the transitionable viewpoint.

Thereafter, the metadata generation unit 103 outputs the metadata including the transition identification information, the transition execution region information, and the transition trigger information to the file generation unit 104.

The file generation unit 104 receives the 3DoF image data from the encoding unit 102. Further, the file generation unit 104 receives the metadata including the transition identification information, the transition execution region information, and the transition trigger information from the metadata generation unit 103. Then, the file generation unit 104 stores the acquired 3DoF image data in an ISOBMFF file for each segment to form a file, thereby generating a segment file of the 3DoF image data. Further, the file generation unit 104 stores, in each ISOBMFF file, various pieces of information such as the transition identification information, the transition execution region information, and the transition trigger information included in the metadata. Each TrackBox of the IOSBMFF file includes information regarding one viewpoint image. Hereinafter, each TrackBox in the IOSBMFF file may be simply referred to as a track. For example, each track of the IOSBMFF file includes a link to specific viewpoint image data, and the like.

Here, storage of the transition identification information in the ISOBMFF file by the file generation unit 104 will be described. The file generation unit 104 generates ViewpointTrackGroupBox indicated by a syntax 111 of FIG. 3 in order to store the transition identification information. FIG. 3 is a diagram for describing the storage of the transition identification information.

ViewpointTrackGroupBox is a box used in a case where Multiple Viewpoint of OMAF is used. ViewpointTrackGroupBox is a box included in TrackBox of the ISOBMFF file, and stores viewpoint information, position information, group information, coordinate rotation information, and the like of the video included in TrackBox. That is, ViewpointTrackGroupBox corresponds to one piece of viewpoint image data.

signed viewpoint_lavel indicated by a syntax 112 represents the viewpoint information of the video included in the track. The viewpoint information is, for example, viewpoint_id, which is the identification information of the viewpoint, and coincides with track_group_id. Further, ViewPosStruct( ) represents the position information of the viewpoint.

ViewpointGroupStruct( ) is information for grouping viewpoints, and includes VWPT_group_id and VWPT_group_descrption. A group of viewpoints is, for example, a group of viewpoints in a certain building. The same coordinates are used in the group.

ViewpointGlobalCoordinateSysRotationStruct( ) includes rotation information in a global coordinate system to which the viewpoint refers. ViewpointGlobalCoordinateSysRotationStruct( ) depends on setting at the time of image capturing. A relationship between two viewpoints can be expressed by ViewpointGlobalCoordinateSysRotationStruct( ).

Further, the file generation unit 104 according to the present embodiment extends ViewpointTrackGroupBox as shown in the syntax 111, and stores SwitchableContentStruct( ) indicating the transition identification information in ViewpointTrackGroupBox.

The file generation unit 104 newly defines SwitchableContentStruct( ) indicated by the syntax 112. The file generation unit 104 expresses the transition identification information for identifying a viewpoint transitionable from a viewpoint image that is an omnidirectional video at a certain viewpoint by SwitchableContentStruct( ). As described above, by storing SwitchableContentStruct( ), which is the transition identification information, in ViewpointTrackGroupBox, the transition identification information corresponding to specific viewpoint image data is stored in the ISOBMFF file that stores the specific viewpoint image data.

Here, in the present embodiment, the file generation unit 104 stores SwitchableContentStruct( ), which is the transition identification information, in ViewpointTrackGroupBox, but the present invention is not limited thereto, and it is also possible to store SiwtchableContentStruct( ) in TrackGroupTypeBox( ). Further, the file generation unit 104 stores the transition execution region information and the transition trigger information corresponding to a specific viewpoint image data in the ISOBMFF file that stores the specific viewpoint image data. As a result, the file generation unit 104 completes the segment file of the 3DoF content.

Further, the file generation unit 104 generates a media presentation description (MPD) file on the basis of the metadata acquired from the metadata generation unit 103. In the MPD file, meta information of the 3DoF content such as a media type and information of a segment file of a moving image or sound is stored. Thereafter, the file generation unit 104 outputs the generated segment file and MPD file of the 3FoF content to the communication unit 12.

The communication unit 12 acquires, from the file generation unit 104, the segment file and the MPD file of the 3DoF content in which the 3DoF image data, the metadata, the transition identification information, the transition execution region information, and the transition trigger information are stored. Then, the communication unit 12 transmits and uploads the acquired segment file and MPD file of the 3DoF content to the web server 3.

(Configuration of Client Device According to First Embodiment)

Figure 4:
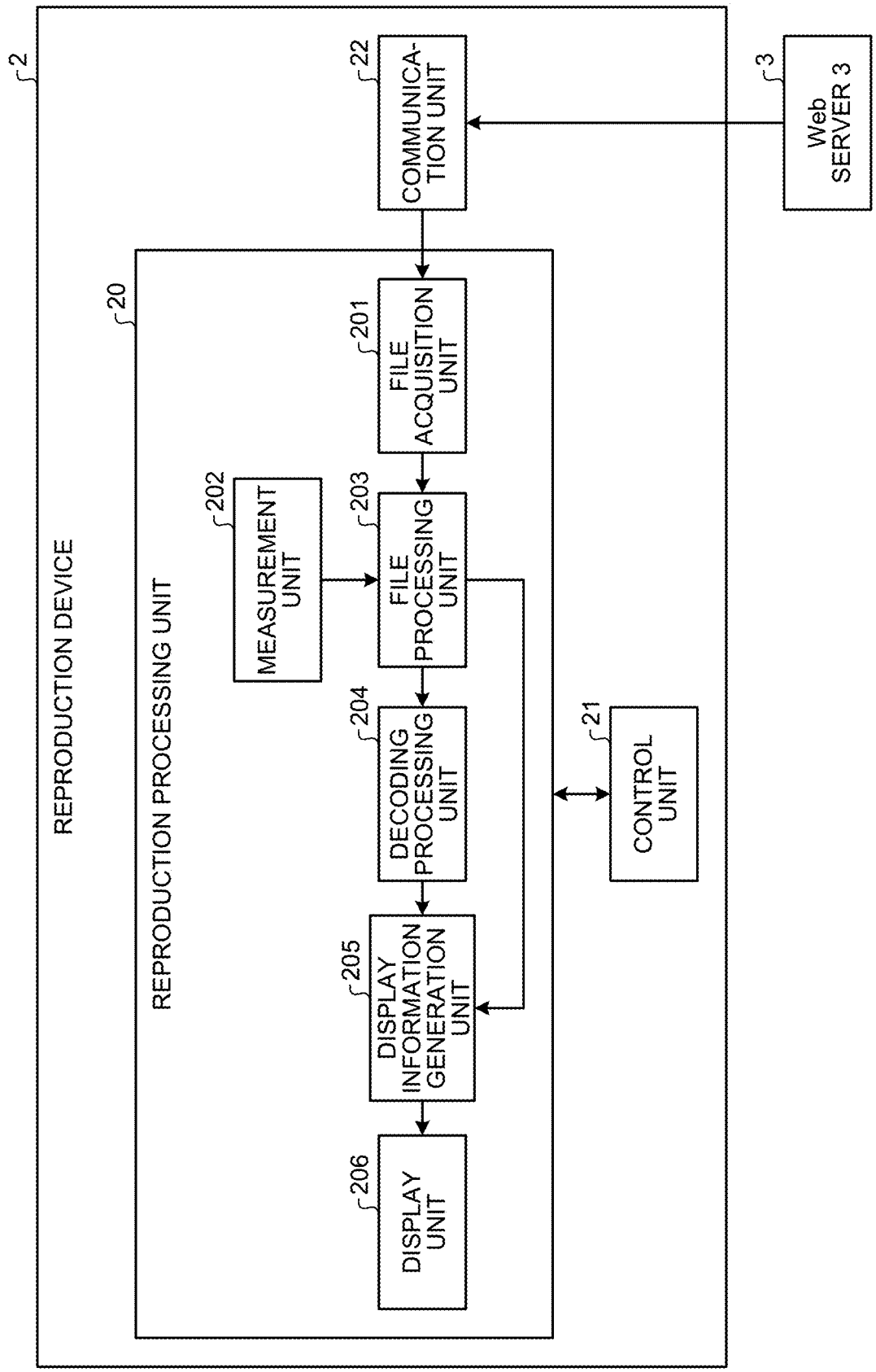
FIG. 4 is a block diagram of a client device.

FIG. 4 is a block diagram of the client device. As illustrated in FIG. 4, the client device 2 includes a reproduction processing unit 20, a control unit 21, and a communication unit 22. The control unit 21 controls an operation of each unit of the reproduction processing unit 20. For example, the control unit 21 performs a centralized control of a timing of the operation of each unit of the reproduction processing unit 20. The reproduction processing unit 20 includes a file acquisition unit 201, a measurement unit 202, a file processing unit 203, a decoding processing unit 204, a display information generation unit 205, and a display unit 206.

The communication unit 22 acquires the segment file and the MPD file of the 3DoF content from the web server 3. Then, the communication unit 22 outputs the acquired segment file and MPD file of the 3DoF content to the file acquisition unit 201.

The file acquisition unit 201 acquires the MPD file corresponding to the 3DoF content to be reproduced from the web server 3 via the communication unit 22. The MPD file includes information regarding a storage destination of the data of the 3DoF content and information regarding video reproduction such as an encoding speed or an image size. Then, the file acquisition unit 201 outputs the acquired MPD file to the file processing unit 203. Thereafter, the file acquisition unit 201 receives the information regarding the storage destination of the data of the 3DoF content to be reproduced from the file processing unit 203.

The file acquisition unit 201 makes a request to the web server 3 for acquiring the data of the 3DoF content by using the acquired information regarding the storage destination of the data of the 3DoF content. Then, the file acquisition unit 201 acquires the segment file of the 3DoF content. Thereafter, the file acquisition unit 201 outputs the segment file of the 3DoF content to the file processing unit 203.

The measurement unit 202 measures a transmission band of a transmission path between the client device 2 and the web server. Then, the measurement unit 202 outputs a result of measuring the transmission band to the file processing unit 203. In addition, the measurement unit 202 receives an operation of an operator such as movement of the viewpoint. For example, in a case where the transition execution region is displayed in the 3DoF image displayed on the monitor, the operator performs an operation such as clicking the transition execution region. Then, the measurement unit 202 outputs the operation of the user to the file processing unit 203.

The file processing unit 203 receives the MPD file corresponding to the 3DoF content to be reproduced from the file acquisition unit 201. Then, the file processing unit 203 parses the acquired MPD file and acquires information indicating the data of the 3DoF content to be reproduced. Further, the file processing unit 203 also recognizes a plurality of pieces of data used for adaptive delivery. For example, in a case of adaptive delivery in which a bit rate is switched, the file processing unit 203 acquires information of the 3DoF image data corresponding to each bit rate. Thereafter, the file processing unit 203 selects the 3DoF content to be reproduced, and outputs information of the selected 3DoF content to the file acquisition unit 201.

The file processing unit 203 receives the segment file in which the data of the 3DoF content to be reproduced is stored from the file acquisition unit 201. The file processing unit 203 parses the acquired segment file. Then, the file processing unit 203 acquires the 3DoF image data, the metadata, the transition identification information, the transition execution region information, and the transition trigger information.

Further, the file processing unit 203 receives the result of measuring the transmission band from the measurement unit 202. Then, the file processing unit 203 selects the 3DoF image data to be reproduced on the basis of the parsing result, the information indicating the transmission band acquired from the measurement unit 202, and the like. Then, the file processing unit 203 outputs the selected 3DoF image data to the decoding processing unit 204. Further, the file processing unit 203 outputs the acquired metadata and transition execution region information to the display information generation unit 205.

In addition, the file processing unit 203 receives the operation of the operator from the measurement unit 202. Then, the file processing unit 203 determines whether or not the input operation is an operation for the transition execution region that receives a viewpoint transition operation, by using the transition execution region information. Furthermore, the file processing unit 203 determines, by using the transition trigger information, whether or not the operation of the operator is an operation serving as a transition trigger that causes viewpoint transition.

In a case where the operation of the operator is an operation that serves as a transition trigger for the transition execution region, the file processing unit 203 acquires the transition destination viewpoint in a case where the transition corresponding to the input operation is executed from the acquired transition identification information. Then, the file processing unit 203 specifies the 3DoF content corresponding to the acquired viewpoint.

In a case where the specified 3DoF content has not been acquired, the file processing unit 203 outputs information of the specified 3DoF content to the file acquisition unit 201 to request acquisition of the specified 3DoF content. Thereafter, once the segment file of the specified 3DoF content is acquired, the file processing unit 203 performs parsing to acquire the 3DoF image data, the metadata, and the transition identification information of the 3DoF content. Then, the file processing unit 203 outputs the acquired 3DoF image data to the decoding processing unit 204. Further, the file processing unit 203 outputs the metadata to the display information generation unit 205 and gives an instruction for switching of the 3DoF content.

The decoding processing unit 204 receives the 3DoF image data from the file processing unit 203. Then, the decoding processing unit 204 performs decoding processing on the data of the acquired 3DoF image data. Thereafter, the decoding processing unit 204 outputs the 3DoF image data subjected to the decoding processing to the display information generation unit 205.

The display information generation unit 205 receives the decoded 3DoF image data from the decoding processing unit 204. In addition, the display information generation unit 205 receives the metadata and the transition execution region information from the file processing unit 203. Then, the display information generation unit 205 generates a display image from the 3DoF image data by using information regarding the viewpoint position, a viewpoint direction, and a time specified by the metadata. Further, the display information generation unit 205 sets a region of the display image that is specified by the transition execution region information as the transition execution region. Thereafter, the display information generation unit 205 provides the generated display image to the display unit 206 to display.

In addition, while the display image generated from the 3DoF image data is displayed on the display unit 206, the display information generation unit 205 may receive an instruction to switch the 3DoF content from the file processing unit 203. In this case, the display information generation unit 205 acquires the 3DoF image data from the 3DoF content specified by the file processing unit 203. Then, the display information generation unit 205 causes the display unit 206 to display the display image generated from the acquired 3DoF image data, and switches the viewpoint. Also in this case, the display information generation unit 205 sets the transition execution region also in the display image after the viewpoint transition.

The display unit 206 includes a display device such as a monitor. The display unit 206 receives the display image generated by the display information generation unit 205. Then, the display unit 206 causes the display device to display the acquired display image.

(File Generation Procedure According to First Embodiment)

Next, a flow of file generation processing performed by the file generation device 1 according to the first embodiment will be described in detail with reference to FIG. 5. FIG. 5 is a flowchart of the file generation processing performed by the file generation device.

The data acquisition unit 101 acquires original data of the 3DoF content. The original data includes image data and control information of an image viewed from a plurality of viewpoints. Then, the data acquisition unit 101 outputs the control information included in the acquired original data to the metadata generation unit 103. The metadata generation unit 103 generates the metadata including the transition identification information, the transition execution region information, and the transition trigger information by using the control information (Step S101).

In addition, the data acquisition unit 101 outputs the image data included in the acquired original data to the encoding unit 102. The encoding unit 102 uses the image data to generate a plurality of pieces of viewpoint image data that are pieces of data of each image when viewed from a plurality of viewpoints (Step S102).

Next, the metadata generation unit 103 associates the transition identification information, the transition execution region information, and the transition trigger information with each piece of viewpoint image data generated by the encoding unit 102, and generates viewpoint image data indicating the transitionable viewpoint (Step S103).

The file generation unit 104 acquires the encoded viewpoint image data from the encoding unit 102. Further, the file generation unit 104 acquires, from the metadata generation unit 103, the metadata including information in which the transition identification information, the transition execution region information, and the transition trigger information are associated with each piece of viewpoint image data. Then, the file generation unit 104 stores the 3DoF image data including the plurality of pieces of viewpoint image data in the ISOBMFF file for each segment. Further, the file generation unit 104 stores the transition identification information, the transition execution region information, and the transition trigger information corresponding to each piece of viewpoint image data in the ISOBMFF file, and generates the segment file of the 3DoF content (Step S104).

Next, the file generation unit 104 outputs the generated segment file of the 3DoF content to the communication unit 12. The communication unit 12 outputs the segment file of the 3DoF content generated by the file generation unit 104 to the web server 3 (Step S105).

Next, metadata generation processing will be described in detail with reference to FIG. 6. FIG. 6 is a flowchart of the metadata generation processing. The processing illustrated in the flowchart of FIG. 6 corresponds to an example of the processing performed in Step S101 of FIG. 5.

The metadata generation unit 103 assigns the identification information to each viewpoint notification of which is provided by the control information acquired from the data acquisition unit 101. Next, the metadata generation unit 103 generates the transition identification information indicating the viewpoint transitionable from the viewpoint that is the transition source by using the identification information for each viewpoint on the basis of a correspondence relationship of the transitionable viewpoint included in the control information (Step S111).

Next, the metadata generation unit 103 calculates the display position of the transition execution region corresponding to the transition destination viewpoint in the viewpoint image of the transition source on the basis of the position information of the viewpoint included in the control information (Step S112).

Next, the metadata generation unit 103 generates the transition execution region information indicating the transition execution region on each viewpoint image by using the calculated display position of the transition execution region (Step S113).

Next, the metadata generation unit 103 generates the transition trigger information indicating the operation serving as the trigger for executing the transition specified by the control information (Step S114). Thereafter, the metadata generation unit 103 also generates the control information and the like related to image generation and reproduction such as a codec to be used, and ends the generation of the metadata including the transition identification information, the transition execution region information, and the transition trigger information.

(Reproduction Processing Procedure According to First Embodiment)

Next, a flow of reproduction processing performed by the client device 2 will be described with reference to FIG. 7. FIG. 7 is a flowchart of the reproduction processing performed by the client device.

The file acquisition unit 201 acquires the MPD file corresponding to the 3DoF content to be reproduced from the web server 3 via the communication unit 22. Next, the file processing unit 203 parses the MPD file and performs analysis processing. Then, the file acquisition unit 201 acquires, from the web server 3, the segment file of the 3DoF content to be reproduced specified in the analysis result by the file processing unit 203 (Step S201).

The file processing unit 203 parses the segment file of the 3DoF content acquired by the file acquisition unit 201. Next, the file processing unit 203 performs the analysis processing of the metadata obtained by the parsing (Step S202).

Then, in a case where the operation of the operator is received from the measurement unit 202, the file processing unit 203 determines a configuration of the content to be reproduced from the metadata analysis processing result in consideration of such information (Step S203).

The file processing unit 203 acquires the segment file of the 3DoF content according to the determined configuration of the content (Step S204).

The file processing unit 203 acquires the 3DoF image data from the acquired segment file of the 3DoF content and outputs the 3DoF image data to the decoding processing unit 204. The decoding processing unit 204 performs decoding processing on the 3DoF image data. Thereafter, the decoding processing unit 204 outputs the decoded 3DoF image data to the display information generation unit 205. The display information generation unit 205 performs viewing processing of generating the display image including the transition execution region and displaying the display image on the display unit 206 by using the information included in the metadata (Step S205).

Next, viewpoint transition processing will be described in detail with reference to FIG. 8. FIG. 8 is a flowchart of the viewpoint transition processing.

The file processing unit 203 parses the segment file of the 3DoF content to acquire the metadata, and acquires the transition identification information, the transition execution region information, and the transition trigger information from the metadata (Step S211).

Next, the file processing unit 203 acquires the 3DoF image data to be displayed (Step S212).

Next, the file processing unit 203 outputs the acquired 3DoF image data to the decoding processing unit 204. The file processing unit 203 outputs the acquired metadata to the display information generation unit 205. The decoding processing unit 204 decodes the 3DoF image data, and outputs the decoded 3DoF image data to the display information generation unit 205. The display information generation unit 205 generates the display image from the 3DoF image data and the metadata, and causes the display unit 206 to display the display image (Step S213).

Thereafter, the file processing unit 203 receives a notification of the operation of the operator from the measurement unit 202 (Step S214).

Next, the file processing unit 203 confirms that the input operation is an operation serving as the transition trigger for the transition execution region. Then, the file processing unit 203 specifies the transition destination viewpoint according to the operation. Next, the file processing unit 203 acquires the segment file including the viewpoint image data of the specified transition destination viewpoint (Step S215).

Next, the file processing unit 203 acquires the transition destination viewpoint image data, causes the decoding processing unit 204 to decode the viewpoint image data, transmits the decoded viewpoint image data to the display information generation unit 205, and gives an instruction for switching of the content. The display information generation unit 205 receives the instruction to switch the content from the file processing unit 203 together with the transition destination viewpoint image data. Thereafter, the display information generation unit 205 generates the display image from the acquired viewpoint image data and displays the display image on the display unit 206, thereby switching the viewpoint of the display image to the transition destination viewpoint (Step S216).

As described above, the file generation device according to the present embodiment generates information indicating the transitionable viewpoint and stores the information in the 3DoF content in association with the viewpoint of each 3DoF image. As a result, the client device can identify the transitionable viewpoints among the viewpoints of the displayed 3DoF image and provide the viewpoints to the operator. Furthermore, once the operator specifies the transition destination viewpoint among the provided transitionable viewpoints and gives an instruction for switching, the client device can perform switching from the 3DoF image viewed from the current viewpoint to the 3DoF image viewed from the specified viewpoint. In other words, in the delivery system according to the present embodiment, the operator can recognize the transitionable viewpoints, and can specify the transition destination viewpoint among the transitionable viewpoints to execute transition to a desired video. As a result, it is possible to provide the user with a viewing experience such as transition to a desired image as intended by the creator, such that it is possible to provide the user with a high-quality viewing experience.

1.1 Modified Example (1) of First Embodiment

Next, Modified Example (1) of the first embodiment will be described. In the present modified example, the transition identification information is stored in a VWPT descriptor defined by MPEG-DASH.

The metadata generation unit 103 according to the present modified example extends the VWPT descriptor in the MPD file as illustrated in FIG. 9 in order to store the transition identification information. FIG. 9 is a diagram illustrating an extension example of the VWPT descriptor. The metadata generation unit 103 newly defines ViewPointInfo.SwitchableContent and ViewPointInfo.SwitchableContent@content in two rows from the bottom of FIG. 9 in the VWPT descriptor. ViewPointInfo.SwitchableContent@content represents the identification information of the viewpoint.

The file generation unit 104 generates the MPD file of the 3DoF content indicated by a syntax illustrated in FIG. 10, and stores ViewpintInfo.SwitchableContent in the VWPT descriptor. FIG. 10 is a diagram illustrating an example of the MPD file in which ViewpintInfo.SwitchableContent is included in the VWPT descriptor. In the MPD file of FIG. 10, AdaptationoSet is provided for each viewpoint, and an ID of the viewpoint transitionable from the viewpoint is indicated by a value of SwitchableContent content therein.

As described above, the transition identification information can also be stored in the VWPT descriptor. As described above, even in a case of being stored in the VWPT descriptor, it is possible to provide the identification information of the transitionable viewpoint to the client device, and to provide a high-quality viewing experience to the user.

1.2 Modified Example (2) of First Embodiment

Next, Modified Example (2) of the first embodiment will be described. In the present modified example, information of a viewpoint group including a plurality of transitionable viewpoints that are the transition destinations is used as the transition identification information.

The metadata generation unit 103 according to the present modified example adds identification information to each viewpoint. Further, the metadata generation unit 103 generates a viewpoint group including a plurality of viewpoints and adds identification information thereto. For example, the metadata generation unit 103 generates the viewpoint group by grouping the pieces of identification information of the viewpoints. Then, for each viewpoint, the metadata generation unit 103 selects a viewpoint group including viewpoints transitionable from the viewpoint. Then, the metadata generation unit 103 generates the transition identification information for identifying the transitionable viewpoint group from the viewpoint image data of each viewpoint by using the identification information of the viewpoint and the viewpoint group. Then, the metadata generation unit 103 outputs the transition identification information to the file generation unit 104.

The file generation unit 104 receives the transition identification information from the metadata generation unit 103. Then, the file generation unit 104 newly defines SwitchableContentStruct( ) representing the transition identification information indicated by a syntax 131 of FIG. 11. VQPT_group_id in the syntax 131 corresponds to the identification information of the viewpoint group. FIG. 11 is a diagram illustrating an example of storage of the transition identification information having the viewpoint group as the transition destination. Further, the metadata generation unit 103 stores SwitchableContentStruct( ) in ViewpointTrackGroup of the ISOBMFF file. As a result, the file generation unit 104 associates the viewpoint image data stored in the ISOBMFF file with the transition identification information, such that it is possible to identify the transitionable viewpoint group from the viewpoint image data.

In the above description, the viewpoint group is set as the transition destination, but information of another video may be set as the transition destination. For example, the metadata generation unit 103 can use, as information indicating another video that is the transition destination, information regarding access to another video specified by a uniform resource locator (URL) such as a URL representing MPD or a URL representing a position on the web. In this case, the metadata generation unit 103 generates the transition identification information having another video as the transition destination, and outputs the transition identification information to the file generation unit 104.

The file generation unit 104 receives the transition identification information having another video as the transition destination from the metadata generation unit 103. Then, the file generation unit 104 newly defines SwitchableContentStruct( ) indicated by a syntax 132 of FIG. 11, and stores the transition identification information. In the syntax 32, MPD_URL corresponds to identification information of another video that is the transition destination.

As described above, in the file generation device according to the present modified example, one other than the viewpoint is specified as the transition destination, and the client device can identify the transition destination. In this manner, by specifying one other than the viewpoint as the transition destination, it is possible to provide, to the user, a transition destination from an image represented by specific viewpoint image data, and to provide a high-quality viewing experience to the user.

2. Second Embodiment

In the present embodiment, generation of the transition execution region indicating a transition execution region that is a region for receiving an operation used to transition a video will be described in detail. A file generation device 1 according to the present embodiment provides the transition execution region as an interactive region for transitioning the viewpoint. The file generation device 1 according to the present embodiment is also represented by the block diagram of FIG. 2. In the following description, a description of processing performed by each unit similar to that of the first embodiment may be omitted.

A metadata generation unit 103 calculates the display position of the transition execution region corresponding to the transition destination viewpoint in the viewpoint image of the transition source on the basis of position information and direction information of the viewpoint included in the control information. For example, the metadata generation unit 103 obtains, as the transition execution region information, a size of the transition execution region and the display position of the transition execution region in the omnidirectional video which is the viewpoint image. In the present embodiment, the metadata generation unit 103 sets an interactive rectangular region on the omnidirectional video as the transition execution region. In a case where the transition execution region is rectangular, the size of the transition execution region is represented by a length and a width. For example, the metadata generation unit 103 determines the transition execution region as a region for displaying information regarding a viewpoint transitionable in a viewpoint direction on the omnidirectional image, and generates the transition execution region information. Furthermore, the metadata generation unit 103 generates information in which the transition execution region is associated with identification information of the viewpoint corresponding to the transition execution region.

Then, the metadata generation unit 103 outputs, to a file generation unit 104, the transition execution region information and information in which the transition execution region is associated with the viewpoint corresponding to the transition execution region. At this time, the metadata generation unit 103 also outputs the transition identification information to the file generation unit 104.

The file generation unit 104 receives, from the metadata generation unit 103, the transition identification information, the transition execution region information, and the information in which the transition execution region is associated with the viewpoint corresponding to the transition execution region. Next, the file generation unit 104 generates SphereRegionStruct( ) indicating the transition execution region which is a rectangular region. Then, the file generation unit 104 newly defines SphereRegionStruct( ) illustrated in FIG. 12 and RegionForViewpoint( ) for storing the transition identification information. FIG. 12 is a diagram illustrating an example of SphereRegionStruct( ) and RegionForViewpoint( ). SphereRegionStruct( ) in a syntax 211 corresponds to the transition execution region information. Furthermore, in the syntax 211, the transition identification information, in which a transitionable viewpoint is indicated by viewpoint_id, is stored. That is, both the transition identification information and the transition execution region information are stored in RegionForViewpoint( ).

Further, the file generation unit 104 extends ViewpointTrackGroup as shown in the syntax 212, and stores newly defined RegionForViewpoint( ) in ViewpointTrackGroup. That is, the file generation unit 104 stores the transition execution region information in ViewpointTrackGroupBox in TracckBox of the ISOBMFF file. A client device 2 can provide, to a user who views a 3DoF video, information regarding a video of the transition destination as interactive visual information by using the transition execution region information stored in ViewpointTrackGroupBox.

As described above, the file device according to the present embodiment arranges an interactive region for transitioning the viewpoint on the omnidirectional video, which is the 3DoF image, as the transition execution region. Then, by arranging and displaying the transition execution region information on the omnidirectional image, the client device can provide the interactive transition execution region to the user, and the quality of the viewing experience of the user can be improved.

2.1 Modified Example (1) of Second Embodiment

The file generation device 1 according to the present modified example provides the transition execution region to the client device 2 by using OMAF technology. Here, an overlay of the OMAF will be described.

In the existing OMAF technology, the overlay is defined as a technology for superimposing another video or the like on the omnidirectional video. The video superimposed by the overlay may be either a moving image or a still image. OverlayStruct( ) is specified in ISOBMFF as a storage destination of information regarding the video to be superimposed. OverlayStruct( ) is stored in VisualDample( ) in the ISOBMFF file in a case of a moving image, and is stored in ItemPropertyContainerBox( ) in the ISOBMFF file in the case of a still image.

FIG. 13 is a diagram illustrating a control structure of the overlay. Overlay_control_struct[i] whose content is a control structure shown in a table 221 in FIG. 13 is defined in OverlayStruct( ). Overlay_control_struct[i] provides property information indicating various overlay structures by a value of i. Among these properties, SphereRelativeOmniOverlay( ) in a case where i=1 is a property indicating an overlay region on the omnidirectional video. In addition, AssociatedSphereRegion( ) in a case where i=10 is a property indicating a region related to the overlay, and it is possible to perform switching between display and non-display of the associated overlay by clicking this region.

The file generation device 1 according to the present modified example provides the transition execution region to the client device 2 by using the overlay technology of the OMAF described above. Hereinafter, processing performed by each unit in the present modified example will be described.

The metadata generation unit 103 calculates the transition execution region. Then, the metadata generation unit 103 generates transition execution information so as to correspond to the overlay of the OMAF. Thereafter, the metadata generation unit 103 outputs the transition execution information to the file generation unit 104.

The file generation unit 104 receives the transition execution region information from the metadata generation unit 103. Then, the file generation unit 104 uses SphereRelativeOmniOverlay( ) indicated by a syntax 222 of FIG. 14 to overlay a video display region on the omnidirectional image on which the transition execution region is displayed. FIG. 14 is a diagram illustrating an example of SphereRelativeOmniOverlay( ) and AssociatiedSpereRegion( ).

SphereRelativeOmniOverlay( ) indicates the video display region overlaid on the omnidirectional image. proj_picture_width and proj_picture_hight in the syntax 222 represent images to be pasted on the overlaid video display region. In addition, proj_reg_width, roj_reg_hight, proj_reg_top, and proj_reg_reft in syntax 222 represent the overlaid video display region of the overlay to which the image is to be pasted.

Further, the file generation unit 104 according to the present embodiment uses, for storing the transition execution region, AssociatedSphereRegion( ) in a case of Overlay_control_struct[10] in the control structure of the overlay. AssociatiedSpereRegion( ) indicates a region related to the overlay. The region indicated by AssociatiedSpereRegion( ) is a region in which display and non-display of the overlay associated with the region can be switched in a case where an operation such as clicking is performed, for example.

In this case, the file generation unit 104 generates AssociatiedSpereRegion( ) indicated by a syntax 223 of FIG. 14. Here, in order to associate the transition execution region with the transitionable viewpoint, the file generation unit 104 extends AssociatiedSpereRegion( ) as indicated by a syntax 223, and stores viewpoint_id which is identification information of the viewpoint to be associated.

As described above, in the present modified example, the transition execution region is displayed on the omnidirectional video by using the overlay technology of the OMAF. As a result, the user can confirm the transition execution region displayed on the omnidirectional video, and can easily move the viewpoint.

2.2 Modified Example (2) of Second Embodiment

The file generation device 1 according to the present modified example adds a new definition to the structure of the overlay and stores the transition execution region information by using the structure. Hereinafter, details of a method of storing the transition execution region information in the present modified example will be described.

Instead of using AssociatedSphereRegion( ), the file generation unit 104 newly defines a new control structure for storing the transition execution region information in overlay_control_struct( ) representing the control structure of the overlay as shown in a table 231 of FIG. 15. FIG. 15 is a diagram illustrating an example of overlay_control_struct( ) to which the new control structure for storing the transition execution region information is newly added. In the present modified example, the file generation unit 104 adds Associatedviewpointregion( ) in a case where i=12 to overlay_control_struct( ) as the new control structure.

Then, the file generation unit 104 generates Associatedviewpointregion( ) indicated by a syntax 232 as illustrated in FIG. 16. FIG. 16 is a diagram illustrating an example of Associatedviewpointregion( ). Also in this case, the file generation unit 104 stores, in Associatedviewpointregion( ), information in which the transition execution region is associated with the viewpoint.

As described above, in the present modified example, the new control structure is defined in the overlay, and the transition execution region is displayed on the omnidirectional video. Also with such a method, the user can confirm the transition execution region displayed on the omnidirectional video, and can easily transition the viewpoint.

2.3 Modified Example (3) of Second Embodiment

In the modified example (1) of the second embodiment described above, AssociatedSphereRedion is extended in order to associate the transition execution region with the transitionable viewpoint. On the other hand, the file generation device 1 according to the present modified example adds a new definition to the structure of the overlay and associates the transition execution region with the transitionable viewpoint by using the structure. Hereinafter, details of a method of storing the transition execution region in the present modified example will be described.

The file generation unit 104 according to the present embodiment uses, for storing the transition execution region information, AssociatedSphereRegion( ) in a case of Overlay_control_struct[10] in the control structure of the overlay. In addition, as shown in a table 241 of FIG. 17, the file generation unit 104 newly defines a new control structure for storing the transition identification information in overlay_control_struct( ). FIG. 17 is a diagram illustrating an example of overlay_control_struct( ) to which the new control structure for storing the transition identification information is newly added. In the present modified example, the file generation unit 104 adds Associatedviewpoint( ) in a case where i=12 to overlay_control_struct( ) as the new control structure.

FIG. 18 is a diagram illustrating an example of Associatedviewpointregion( ) and AssociatedViewpoint( ). For example, the file generation unit 104 generates Associatedviewpointregion( ) indicated by a syntax 242 illustrated in FIG. 18. In addition, the file generation unit 104 generates Associatedviewpoint( ) indicated by a syntax 243. Then, the file generation unit 104 associates the transition execution region with the transitionable viewpoint by associating AssociatedSphereRegion( ) with Associatedviewpoint( ).

As described above, in the present modified example, the new control structure is defined in the overlay, the information of the transitionable viewpoint is stored, and the information is associated with the transition execution region. Also with such a method, the user can confirm the transition execution region displayed on the omnidirectional video, and can easily move the viewpoint.

2.4 Modified Example (4) of Second Embodiment

In the above-described Modified Examples (1) to (3) of the second embodiment, the video display region and the transition execution region are separately specified, but in a case where these regions have the same position and the same size, the same region is defined at two places, which is inefficient. Therefore, the file generation device 1 according to the present modified example diverts the region by using a flag indicating that the transition execution region is the same as the video display region. Hereinafter, details of a method of storing the transition execution region in the present modified example will be described.

The metadata generation unit 103 determines the transition execution region so that the video display region and the transition execution region in the overlay of the OMAF are the same. The metadata generation unit 103 generates a flag indicating that the video display region matches the transition execution region. Then, the metadata generation unit 103 outputs, to the file generation unit 104, the transition execution region information including the flag indicating that the video display region and the transition execution region match each other.

The file generation unit 104 receives the transition execution region information including the flag indicating that the video display region and the transition execution region match each other from the metadata generation unit 103. Then, the file generation unit 104 specifies the video display region in ShereRalativeOverlay( ). Next, the file generation unit 104 generates AssociatedSphereRegion( ) for storing the transition execution region information. Further, the file generation unit 104 extends AssociatedSphereRegion( ) as indicated by a syntax 251 of FIG. 19 and sets the flag indicating that the transition execution region is the same as the video display region. FIG. 19 is a diagram illustrating an example of AssociatedSphereRegion( ) in a case where the video display region is diverted for the transition execution region. The file generation unit 104 indicates that the transition execution region matches the video display region by using the flag set in AssociatedSphereRegion( ), thereby diverting the information of the video display region for the transition execution region without storing the information of the transition execution region.

Here, a case of using AssociatedSphereRegion( ) has been described in the present modified example, but the file generation unit 104 can also use AssociatedViewpointRegion( ) to indicate the transition execution region. Also in this case, the file generation unit 104 can divert the information of the video display region for the transition execution region by setting the flag indicating that the transition execution region is the same as the video display region in AssociatedViewpointRegion( ).

As described above, in the present modified example, the information of the video display region is diverted for the transition execution region by using the flag newly provided in AssociatedSphereRegion( ). As a result, data can be reduced.

Modified Example (4) of Second Embodiment

In the second embodiment described above, the transition execution region information is always displayed on the omnidirectional video which is the 3DoF image. Therefore, unnecessary information is presented to the user who is not interested in the transition of the viewpoint, and the quality of the viewing experience of the user may be deteriorated. Therefore, the file generation device 1 according to the present modified example displays the transition execution region information on the omnidirectional video in a case where the user views the same omnidirectional video including the transition execution region for a certain period of time. Hereinafter, details of a method of storing the transition execution region information in the present modified example will be described.

The metadata generation unit 103 calculates the transition execution region information. In addition, the metadata generation unit 103 generates time information for controlling the display of the transition execution region on the omnidirectional video. For example, the metadata generation unit 103 generates time information indicating a time until the transition execution region information associated with the displayed omnidirectional video is displayed. Then, the metadata generation unit 103 outputs the time information to the file generation unit 104 together with the transition execution region information.

The file generation unit 104 receives the transition execution region information and the time information from the metadata generation unit 103. Then, the file generation unit 104 newly defines SphereRegionStruct( ) and RegionForViewpoint( ) for storing the transition identification information. Further, the file generation unit 104 stores the time information in RegionForViewpoint( ).

For example, the file generation unit 104 stores, in RegionForViewpoint( ), the time until the transition execution region information associated with the displayed omnidirectional video is displayed, as indicated by a syntax 261 of FIG. 20. FIG. 20 is a diagram illustrating an example of RegionForViewpoint( ) in a case where the transition execution region information is displayed after a certain period of time. time_to_ovelay in the syntax 261 is the time until the transition execution region information is displayed.

A file processing unit 203 of the client device 2 acquires the time until the transition execution region information included in RegionForViewpoint( ) is displayed. Then, the file processing unit 203 instructs a display information generation unit 205 to display the execution region when the specified period of time has elapsed in a state where the 3DoF image is displayed after the display information generation unit 205 is caused to display the 3DoF image. As a result, in the client device 2, the transition execution region is displayed after a certain period of time elapses from the display of the 3DoF image, and the viewpoint can be transitioned.

As described above, in the present modified example, the transition execution region information on the omnidirectional video is not displayed at first but displayed after a certain period of time elapses. As a result, the transition execution region information is displayed in a case where the user is interested in the transition execution region and is highly likely to transition the viewpoint. Therefore, the display of unnecessary information can be reduced, and the quality of the viewing experience of the user can be improved.

3. Third Embodiment

In the present embodiment, generation of the transition trigger information, which is information of an operation in a case of transitioning the viewpoint, will be described in detail. A file generation device 1 according to the present embodiment provides, to a client device 2, information for switching an operation (user interaction) with respect to a region when transitioning the viewpoint. The file generation device 1 according to the present embodiment is also represented by the block diagram of FIG. 2. In the following description, a description of processing performed by each unit similar to that of the first embodiment may be omitted.

A metadata generation unit 103 generates the transition trigger information indicating the user interaction according to information regarding the user interaction specified by the operator. In a case where there are a plurality of specified user interactions, the metadata generation unit 103 generates the transition trigger information indicating that switching is possible between the respective user interactions. For example, in a case where clicking and zooming are specified as the user interactions, the metadata generation unit 103 generates the transition trigger information including information indicating that switching between the clicking and the zooming is possible. Furthermore, for example, in a case where the zooming is used as the user interaction, the metadata generation unit 103 may set a threshold of the zooming that causes the transition and add the threshold to the transition trigger information. Thereafter, the metadata generation unit 103 outputs the generated transition trigger information to the file generation unit 104.

The file generation unit 104 receives the transition trigger information from the metadata generation unit 103. Next, the file generation unit 104 newly defines SphereRegionStruct( ) and RegionForViewpoint( ) for storing the transition identification information. Further, the file generation unit 104 stores information for switching the user interaction with respect to the region in RegionForViewpoint( ) as indicated by a syntax 311 of FIG. 21. FIG. 21 is a diagram illustrating an example of RegionForViewpoint( ) in a case of switching the user interaction.

action_control_flag in the syntax 311 is a flag for switching the user interaction with respect to the transition execution region. For example, the file generation unit 104 defines action_control_flag as follows. In a case where a value of action_control_flag is 0, the transition execution region is clicked to switch to the omnidirectional video viewed from the viewpoint specified by viewpoint_id. Furthermore, in a case where the value of action_control_flag is 1, the transition execution region is zoomed to switch to the omnidirectional video viewed from the viewpoint specified by viewpoint_id.

In addition, in a case where the user interaction is the zooming, the file generation unit 104 sets the threshold of the zooming that causes the transition as shown in the syntax 311. Zoom_threshold in the syntax 311 is a threshold for executing the transition in a case where the user interaction that triggers the transition is the zooming. For example, the file generation unit 104 defines Zoom_threshold as follows. In a case where the threshold of the zooming is defined so that Zoom_threshold>1, the transition is executed in a case where a zoom ratio when zooming in a transitionable region is greater than 1. In addition, in a case where the threshold of the zooming is defined so that Zoom_threshold<1, the transition is executed in a case where a zoom ratio when zooming out the transitionable region is greater than 1.

The setting of the information for switching the user interaction and the setting of the threshold at which the transition occurs can also be applied to AssociatedSphereRegion( ) of Modified Example (2) of the second embodiment or the like. Furthermore, in the present embodiment, a case where the clicking and the zooming are used as the user interactions has been described, but other operations can be similarly set.

4. Fourth Embodiment

Figure 22:
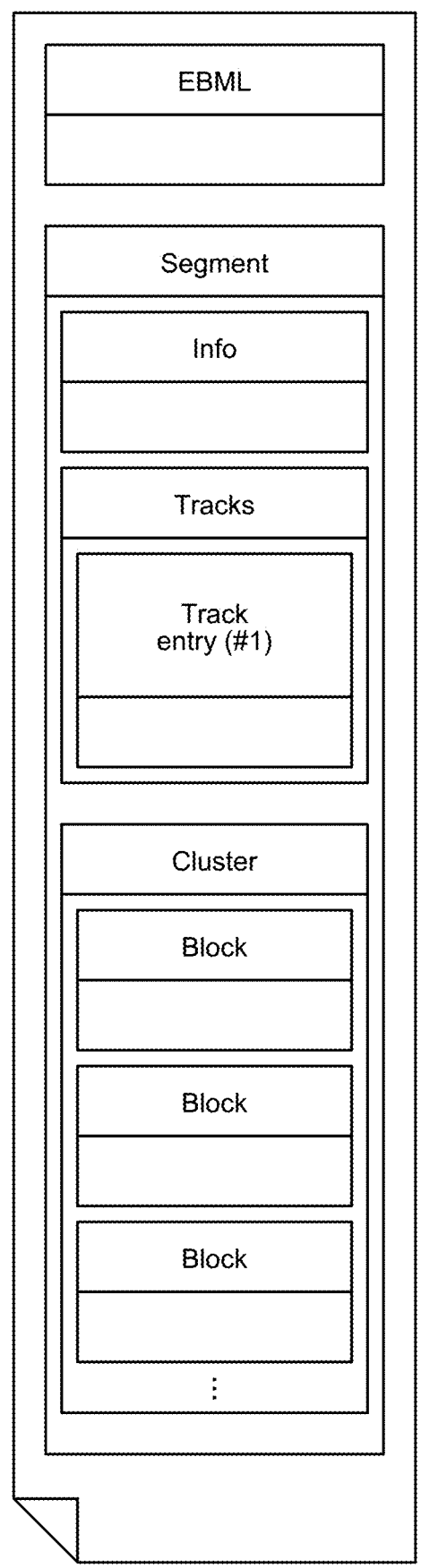
FIG. 22 is a diagram illustrating a format of Matroska Media Container.

In the above embodiments and the modified examples thereof, a case of storing in the ISOBMFF has been described. However, even in a case of transmission using Matroska Media Container (http://www.matroska.org/) illustrated in FIG. 22, it is possible to provide the transition identification information, the transition execution region information, and the transition trigger information. FIG. 22 is a diagram illustrating a format of the Matroska Media Container. In this case, the file generation unit 104 stores the transition identification information, the transition execution region information, and the transition trigger information in an element newly defined in Track Entry element.

[Hardware Configuration]

Figure 23:
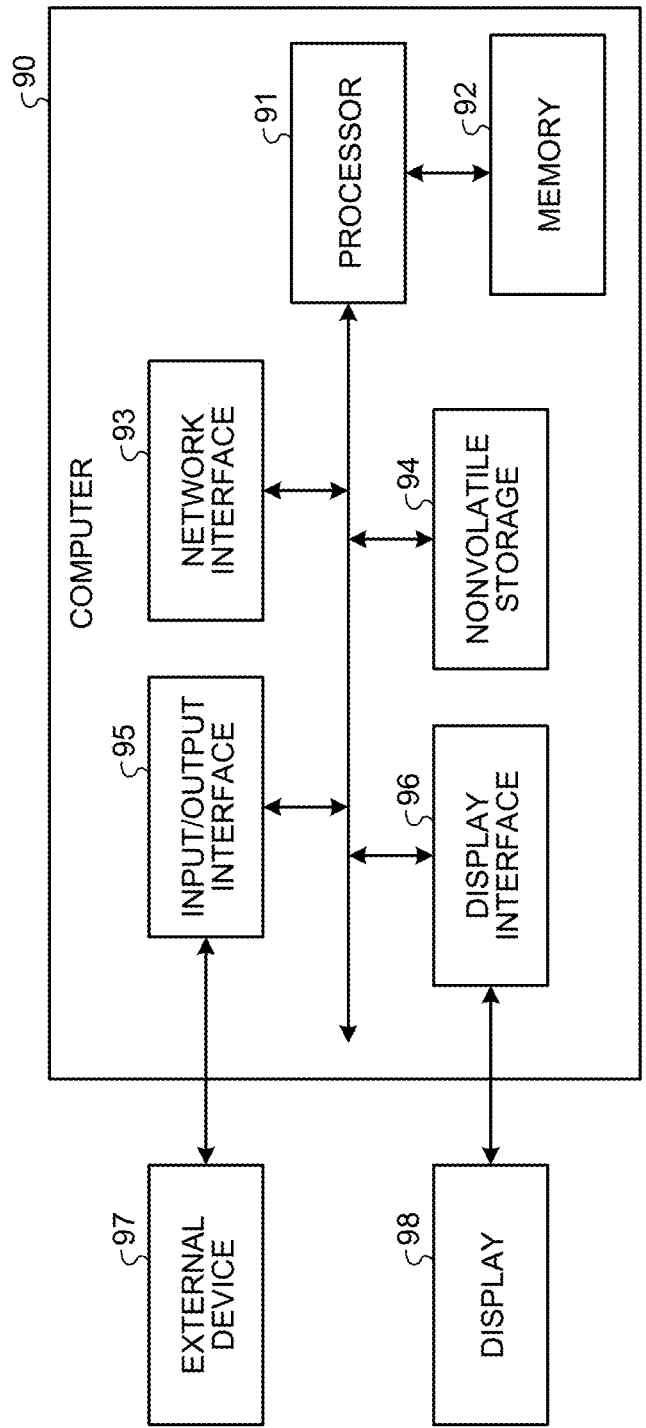
FIG. 23 is a hardware configuration diagram of a computer.

FIG. 23 is a hardware configuration diagram of a computer. The file generation device 1 and the client device 2 can be implemented by a computer 90 illustrated in FIG. 23. In the computer 90, a processor 91, a memory 92, a network interface 93, a nonvolatile storage 94, an input/output interface 95, and a display interface 86 are connected to one another via a bus.

For example, an external device such as an input device, an output device, a storage device, or a drive is connected to the input/output interface 95. The input device is, for example, a keyboard, a mouse, a microphone, a touch panel, an input terminal, or the like. The output device is, for example, a speaker, an output terminal, or the like. The storage device is, for example, a hard disk, a random access memory (RAM) disk, or the like. The drive drives a removable medium such as a magnetic disk, an optical disk, a magneto-optical disk, or a semiconductor memory. Further, a display 98 which is the display device is connected to the display interface 96.

The network interface 93 is connected to an external network. The file generation device 1 and the client device 2 are connected to each other via the network interface 93. Further, the file generation device 1 and the client device 2 are connected to the web server 3 via the network interface 93. The nonvolatile storage 94 is a built-in auxiliary storage device such as a hard disk or a solid state drive (SSD).

In the computer 90 configured as described above, for example, the processor 91 loads a program stored in the nonvolatile storage 94 into the memory 92 via the bus and executes the program, whereby the above-described series of processings is performed. The memory 92 also appropriately stores data and the like necessary for the processor 91 to perform various processings.

The program executed by the processor 91 can be applied by being recorded in a removable medium as a package medium or the like, for example. In this case, the program can be installed in the nonvolatile storage 94 via the input/output interface 95 by mounting the removable medium in the drive that is an external device 97.

Furthermore, this program can also be provided via a wired or wireless transmission medium such as a local area network, the Internet, or digital satellite broadcasting. In this case, the program can be received by the network interface 93 and installed in the nonvolatile storage 94.

In addition, this program can be installed in the nonvolatile storage 94 in advance.

Although the embodiments of the present disclosure have been described above, the technical scope of the present disclosure is not limited to the above-described embodiments, and various modifications can be made without departing from the scope of the present disclosure. Moreover, components of different embodiments and modified examples may be appropriately combined.

Note that the effects described in the present specification are merely examples. The effects of the present disclosure are not limited thereto, and other effects may be obtained.

Note that the present technology can also have the following configurations.

(1)
An information processing device comprising:
  a metadata generation unit that generates transition identification information for identifying a second viewpoint which is a viewpoint position of a second video transitionable from a first video whose viewpoint position is a first viewpoint; and
  a file generation unit that generates a file including data of the first video and the transition identification information.

(2)
The information processing device according to (1), wherein the metadata generation unit generates the transition identification information including identification information for specifying the second viewpoint.

(3)
The information processing device according to (1) or (2), wherein the metadata generation unit generates the transition identification information including identification information of a viewpoint group including a plurality of the second viewpoints.

(4)
The information processing device according to any one of (1) to (3), wherein the metadata generation unit generates the transition identification information including information regarding access to another video specified by URL (a uniform resource locator).

(5)
The information processing device according to any one of (1) to (4), wherein the file generation unit stores the transition identification information in ViewpointTrackGroupBox in TrackBox of an ISOBMFF file.

(6)
The information processing device according to any one of (1) to (4), wherein the file generation unit stores the transition identification information in a VWPT descriptor of MPD (a media presentation description) file.

(7)
The information processing device according to (1), wherein
  the metadata generation unit generates transition execution region information indicating a transition execution region on the first video that receives an operation for transition from the first viewpoint to the second viewpoint, and
  the file generation unit generates the file including the transition execution region information.

(8)
The information processing device according to (7), wherein the metadata generation unit generates the transition execution region information including a size of the transition execution region and a display position in the first video.

(9)
The information processing device according to (7) or (8), wherein the file generation unit stores the transition execution region information in ViewpointTrackGroupBox in TrackBox of an ISOBMFF file.

(10)
The information processing device according to (7) or (8), wherein the metadata generation unit displays the transition execution region information by an overlay of OMAF.

(11)
The information processing device according to (10), in which the metadata generation unit generates the transition execution region information including a flag indicating that the transition execution region is the same as a video display region in the overlay.

(12)
The information processing device according to any one of (7) to (11), wherein the metadata generation unit includes time information for controlling display of the transition execution region on the first video.

(13)
The information processing device according to (1), in which
  the metadata generation unit generates transition trigger information indicating an operation of causing transition from the first viewpoint to the second viewpoint, and the file generation unit includes the transition execution region information in the file.

(14) The information processing device according to (13), wherein the metadata generation unit generates the transition trigger information indicating that the transition is to be caused by clicking.

(15) The information processing device according to (13) or (14), wherein the metadata generation unit generates the transition trigger information indicating that the transition is to be caused by zooming.

(16) The information processing device according to (15), wherein the metadata generation unit generates the transition trigger information including a threshold of the zooming that causes the transition.

(17) An information processing method causing a computer to perform processing of:
generating transition identification information for identifying a second viewpoint which is a viewpoint position of a second video transitionable from a first video whose viewpoint position is a first viewpoint; and
generating a file including data of the first video and the transition identification information.

(18) A reproduction processing device comprising:
a file acquisition unit that acquires a file including transition identification information for identifying a second viewpoint which is a viewpoint position of a second video transitionable from a first video whose viewpoint position is a first viewpoint;
a file processing unit that acquires the transition identification information from the file acquired by the file acquisition unit and specifies the second viewpoint transitionable from the first viewpoint on a basis of the acquired transition identification information; and
a reproduction unit that reproduces the first video and outputs information of the second viewpoint specified by the file processing unit.

(19) A reproduction processing method causing a computer to perform processing of:
acquiring a file including transition identification information for identifying a second viewpoint which is a viewpoint position of a second video transitionable from a first video whose viewpoint position is a first viewpoint;
acquiring the transition identification information from the acquired file and specifying the second viewpoint transitionable from the first viewpoint on a basis of the acquired transition identification information; and
reproducing the first video and outputting information of the specified second viewpoint.

REFERENCE SIGNS LIST

1 FILE GENERATION DEVICE
2 CLIENT DEVICE
3 Web SERVER
4 NETWORK
10 FILE GENERATION PROCESSING UNIT
11 CONTROL UNIT
12 COMMUNICATION UNIT
20 REPRODUCTION PROCESSING UNIT
21 CONTROL UNIT
22 COMMUNICATION UNIT
100 DELIVERY SYSTEM
101 DATA ACQUISITION UNIT
102 ENCODING UNIT
103 METADATA GENERATION UNIT
104 FILE GENERATION UNIT
201 FILE ACQUISITION UNIT
202 MEASUREMENT UNIT
203 FILE PROCESSING UNIT
204 DECODING PROCESSING UNIT
205 DISPLAY INFORMATION GENERATION UNIT
206 DISPLAY UNIT

The invention claimed is:

1. An information processing device comprising:
processing circuitry configured to
generate transition identification information for identifying a second viewpoint which is a viewpoint position of a second video transitionable from a first video whose viewpoint position is a first viewpoint;
generate transition execution region information indicating a transition execution region on the first video that receives an operation for transition from the first viewpoint to the second viewpoint; and
generate a file including data of the first video, the transition identification information, and the transition execution region information.

2. The information processing device according to claim 1, wherein the processing circuitry generates the transition identification information including identification information for specifying the second viewpoint.

3. The information processing device according to claim 1, wherein the processing circuitry generates the transition identification information including identification information of a viewpoint group including a plurality of the second viewpoints.

4. The information processing device according to claim 1, wherein the processing circuitry generates the transition identification information including information regarding access to another video specified by URL (a uniform resource locator).

5. The information processing device according to claim 1, wherein the processing circuitry stores the transition identification information in ViewpointTrackGroupBox in TrackBox of an ISOBMFF file.

6. The information processing device according to claim 1, wherein the processing circuitry stores the transition identification information in a VWPT descriptor of MPD (a media presentation description) file.

7. The information processing device according to claim 1, wherein the processing circuitry generates the transition execution region information including a size of the transition execution region and a display position in the first video.

8. The information processing device according to claim 1, wherein the processing circuitry stores the transition execution region information in ViewpointTrackGroupBox in TrackBox of an ISOBMFF file.

9. The information processing device according to claim 1, wherein the processing circuitry displays the transition execution region information by an overlay of OMAF.

10. The information processing device according to claim 9, wherein the processing circuitry generates the transition execution region information including a flag indicating that the transition execution region and a video display region in the overlay are the same region on the first video.

11. The information processing device according to claim 1, wherein the processing circuitry includes time information for controlling display of the transition execution region on the first video.

12. The information processing device according to claim 1, wherein
the processing circuitry generates transition trigger information indicating an operation of causing transition from the first viewpoint to the second viewpoint, and
the processing circuitry generates the file including the transition trigger information.

13. The information processing device according to claim 12, wherein the processing circuitry generates the transition trigger information indicating that the transition is to be caused by clicking.

14. The information processing device according to claim 12, wherein the processing circuitry generates the transition trigger information indicating that the transition is to be caused by zooming.

15. The information processing device according to claim 14, wherein the processing circuitry generates the transition trigger information including a threshold of the zooming that causes the transition.

16. An information processing method comprising:
generating, using processing circuitry, identification information for identifying a second viewpoint which is a viewpoint position of a second video transitionable from a first video whose viewpoint position is a first viewpoint;
generating, using the processing circuitry, transition execution region information indicating a transition execution region on the first video that receives an operation for transition from the first viewpoint to the second viewpoint; and
generating, using the processing circuitry, a file including data of the first video, the transition identification information, and the transition execution region information.

17. A reproduction processing device comprising:
processing circuitry configured to
acquire a file including (1) transition identification information for identifying a second viewpoint which is a viewpoint position of a second video transitionable from a first video whose viewpoint position is a first viewpoint, and (2) transition execution region information indicating a transition execution region on the first video that receives an operation for transition from the first viewpoint to the second viewpoint;
acquire the transition identification information from the file and specify the second viewpoint transitionable from the first viewpoint on a basis of the acquired transition identification information;
acquire the transition execution region information from the file and specify the transition execution region; and
reproduce the first video and output information of the second viewpoint based on the acquired transition identification information and the acquired transition execution region information.

18. A reproduction processing method comprising:
acquiring, using processing circuitry, a file including (1) transition identification information for identifying a second viewpoint which is a viewpoint position of a second video transitionable from a first video whose viewpoint position is a first viewpoint, and (2) transition execution region information indicating a transition execution region on the first video that receives an operation for transition from the first viewpoint to the second viewpoint;
acquiring, using the processing circuitry, the transition identification information from the acquired file and specifying the second viewpoint transitionable from the first viewpoint on a basis of the acquired transition identification information;
acquiring, using the processing circuitry, the transition execution region information from the file and specifying the transition execution region; and
reproducing, using the processing circuitry, the first video and outputting information of the specified second viewpoint based on the acquired transition identification information and the acquired transition execution region information.

* * * * *